United States Patent

Lyall et al.

[15] 3,695,446
[45] Oct. 3, 1972

[54] MEMBRANE MODULE ASSEMBLY

[72] Inventors: Charles E. Lyall, Deerfield; Stanley F. Rak, Mundelein, both of Ill.

[73] Assignee: Culligan International Company, Northbrook, Ill.

[22] Filed: Oct. 15, 1970

[21] Appl. No.: 80,926

[52] U.S. Cl. ................210/321, 210/433, 210/438, 210/494
[51] Int. Cl. .............................................B01d 31/00
[58] Field of Search......210/321, 433, 494, 438, 439, 210/440, 444

[56] References Cited

UNITED STATES PATENTS 3,542,203  11/1970  Hancock et al............210/321

*Primary Examiner*—Frank A. Spear, Jr.
*Attorney*—Hill, Sherman, Meroni, Gross & Simpson

[57] ABSTRACT

A reverse osmosis membrane module assembly that provides a high degree of adaptability to various locations and positions as well as economical manufacture and efficient maintenance comprises a closed receptacle having a detachable first end closure through which pass all plumbing connections to the interior chamber. Membrane module means are removably supported in the receptacle chamber on an inlet tube connected to the first end closure. The membrane module means may include one or a plurality of modules each comprising a body member having a hollow tubular member extending beyond both ends of the body member. The end portions of the tubular member have connection means thereon that allows quick and simple attachment of the modules to the closure means and to each other in series. A product water passageway that provides for the removal of product water from the membrane module means is formed between the inside diameter of the membrane module tubular member and the outer diameter of the inlet tube. In operation feed water flows in through the first end closure means, through the inlet tube past the membrane in a first direction, enters the chamber at a point remote from the closure means, reverses direction to flow back through the chamber and through the membrane module means where product water passes through the membrane under a pressure differential and waste water flows past the membrane. Both the product water and the waste water then pass out of the chamber through the first end closure means.

7 Claims, 4 Drawing Figures

PATENTED OCT 3 1972

3,695,446

INVENTORS
Charles E. Lyall
Stanley F. Rak

ATTORNEYS

MEMBRANE MODULE ASSEMBLY

BACKGROUND OF THE INVENTION

1. Field of the Invention

This invention generally relates to water treatment apparatus and more particularly concerns a compact and efficient reverse osmosis membrane module assembly having a detachable end closure means through which the assembly is plumbed and which also supports membrane modules in the assembly.

2. Prior Art

Reverse osmosis membrane module assemblies according to the prior art as shown, for example, in U.S. Pat. Nos. 3,367,504; 3,367,505; and 3,456,803 comprise receptacles which receive feed water in one end and allow product water and waste water to pass out through an opposite end. The fluid flow inside the receptacle is unidirectional through a sealed, envelope-type, semi-permeable osmotic membrane spirally wound about a hollow tube with the membranes separated by a fluid conducting spacer. The pressure of the relatively concentrated impure feed water on the outside of the membrane is relatively high as compared with the pressure of the pure of relatively dilute product water inside the membrane envelope so that the normal osmotic flow through the membrane is reversed. The pure water passes through the membrane and continues through the membrane of the hollow tube. The concentrated residue flows on alongside the membrane to be passed out as waste water.

The reverse osmosis membrane assemblies by themselves or in combination with deionizing units and/or submicron filtration means, for example, produce a very pure water and as such find use in a great number of different domestic, industrial, medical and commercial locations. In the majority of these locations the assembly or combination is not included in the original design, but usually must be added to the water supply system after it has been installed. The reverse osmosis assemblies require periodic maintenance so that as a consequence of these conditions as well as the overriding economic considerations, the space and areas in the buildings in which the assemblies may be placed in severely limited. Despite these limitations the prior art devices remain relatively bulky and do not lend themselves to flexibility in their placement and design. Also, the prior art devices are relatively complex and therefore require a high degree of skill and a relatively long time for proper service and maintenance.

SUMMARY OF THE INVENTION

Accordingly, it is an object of this invention to provide a new and improved reverse osmosis membrane module assembly which has great flexibility in design and location and which is readily and simply serviced.

The reverse osmosis membrane module assembly according to the invention which overcomes the disadvantages of the prior art and provides the benefits herein set forth comprises a receptacle having a detachable closure means which define a chamber. All plumbing connections to the chamber pass through the detachable closure means. Thus, the closure incorporates a feed water inlet means, a product water outlet means and a waste water outlet means.

The feed water inlet means includes an elongated inlet tube having a first end connected with the closure means and a second outlet end extending into the chamber at a point remote from the closure means. A membrane module means includes a tubular mandrel member with an envelope-type membrane spirally wound thereon. The tubular member receives the inlet tube therethrough and has an inside configuration slightly larger than the outer configuration of the inlet tube so that a product water passageway is formed therebetween. Water passing into the envelope-type membrane is conducted into this passageway and out through the product water outlet means. The membrane module means includes one or more modules having a generally cylindrically shaped body member with the tubular member extending therethrough in coaxial relation. Each of the tubular members has a first end extending beyond the body portion in one direction and a second end extending beyond the body portion in an opposite direction. The first end of the first module is connected with the first end closure means so that when the end closure is removed the module will also be removed. Where a plurality of modules are used the second end of the first module will be connected to the first end of a second module etc., with the second end of the last module in the series having an end closure thereon that slips over the inlet tube and closes the product water passageway. Suitable seal means such as stab-type joints including an O-ring in a groove are simply effected and provide excellent results.

In operation, fluid feed water under high pressure enters the feed water inlet means in the end closure and is passed through the inlet tube in a first direction through the chamber to an outlet end of the tube remote from the closure means where it enters the chamber. From this point the feed water reverses direction and flows back through the chamber and through the membrane modules towards the end closure means. The feed water contains impurities and may be considered relatively concentrated. A low pressure exists on the inside of the envelope-type membrane so that as the feed water passes the membrane on the outside under the higher pressure, molecules of water will be forced through the membrane by the mechanism of reverse osmosis. The product water passing through the membrane into the envelope will flow through the spiral configuration thereof to the tubular center member of the module and pass through openings in the tubular member into the product water passageway formed with the outside of the inlet tube. From this point the product water passes out through the product water outlet to be used as required.

With the feed water losing molecules of water as it passes through the membrane modules toward the first end closure means it becomes more concentrated and, designated as waste water, it is collected by a groove in the closure means and passes therethrough out of the chamber. The flow of water through the membrane module assembly is kept at a high rate so that the water provides turbulent flow along the membrane to minimize the increase in salt concentration at the surface of the membrane. As a result the membrane life is considerably extended and the module operates under more stable conditions.

With the plumbing connections all through one end of the reverse osmosis assembly, placement of the assemblies need only consider access to that one end. Moreover, the length of the chambers may be varied without changing the size of the membrane modules required. Thus, the receptacle may have lengths corresponding to the different multiples of the membrane modules. Accordingly, the reverse osmosis assembly has the flexibility of design that it may be as easily installed in a narrow deep space as it could be in a wide shallow area.

Serviceability of the assemblies once they are installed is very simple and fool-proof so that a minimum of both skill and time are required. Detachment of a simple securing means allows removability of the first end closure means along with the membrane modules. With the stab-joint connection between the modules they may be readily replaced and the closure reinserted. Moreover, removal of the end closure allows access to all parts of the assembly and hence repairs and maintenance are easily performed. By using maintenance free material such as synthetic plastics of suitable strength manufacture is simplified and the life of the units is increased.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENT

Figure 1:
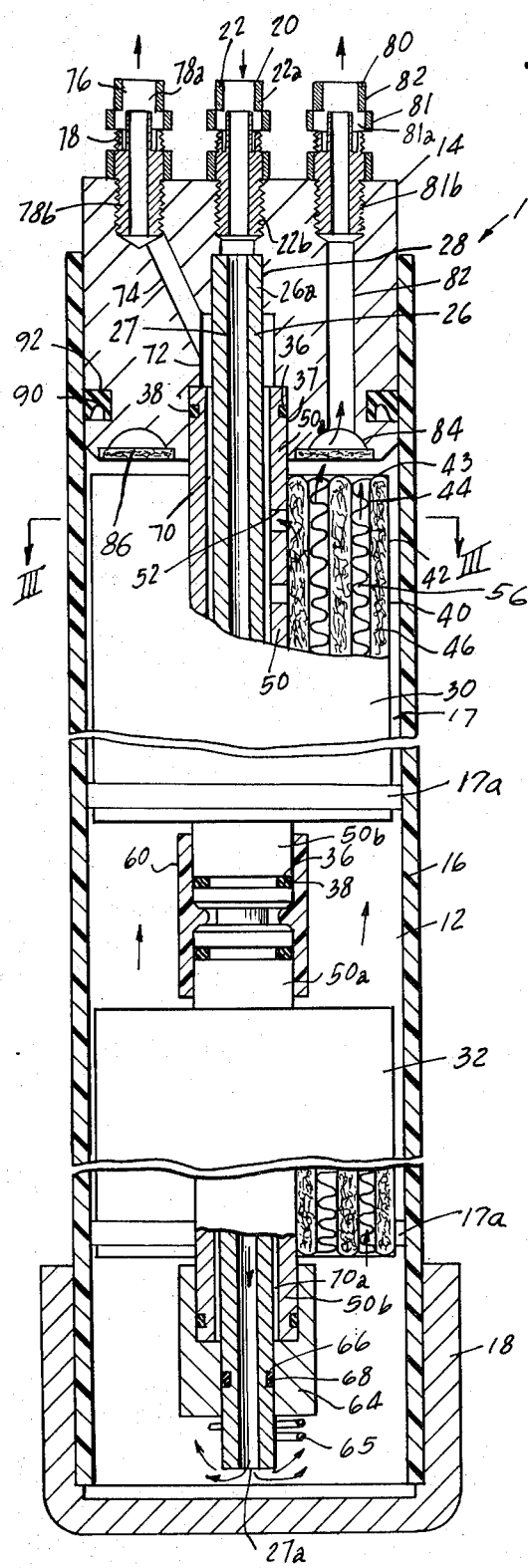
FIG. 1 is a longitudinal cross-section of a membrane module assembly according to the invention and has intermediate portions of the membrane modules cut out for purposes of illustration.

In FIG. 1 there is shown a reverse osmosis membrane module assembly generally indicated at 10 having a chamber 12 defined by a head or first end closure means 14, a tubular body shell 16 and a second or lower end closure 18.

To withstand the normally high operating pressure required in chamber 12, it is advantageous to form the chamber 12 with an elongated cylinder 16. Any suitable material may be employed in the assembly construction. Thus, synthetic resinous plastics have been found to be very workable material and to perform satisfactorily in the conditions encountered. Because the assembly 10 is plumbed from only the first end 14, the lower or second end 18 may ordinarily be permanently closed. In this case, the second closure 18 may be integral with the body shell 16 or take the form of a cap-type structure as shown.

The chamber 12 has at least a first membrane module 30 mounted therein, but may include any greater number of membrane modules such as represented by the second module 32. For purposes of compactness of illustration, the modules 30 and 32 are shown with large intermediate sections cut away. However, it will be understood that they are of similar construction throughout their length. Each module may have a cylindrical configuration with an outer diameter slightly less than the inner diameter of the body shell 16 with the space 17 therebetween being sealed against short circuiting of the water by a suitable seal 17a.

Figure 3:
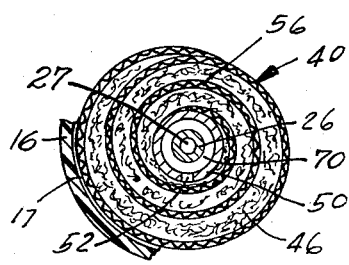
FIG. 3 is a transverse cross-sectional view taken along the line III—III of FIG. 1.

The membrane modules may have a cross-sectional construction generally comprising membrane envelopes spirally wound about a hollow mandrel tube with the interior of the membrane envelope communicating with the tube, as shown, schematically in greatly enlarged form in FIGS. 1 and 3 for purposes of explanation. The modules 30 and 32 are made of a spirally wound membrane envelope means 40 which comprises a first semipermeable membrane 42 and a second semipermeable membrane 44 separated by a layer of an inert spacing or packing material 46. The first and second membranes 42 and 44 are suitably joined together along three of the usual four edges in a manner as shown, for example, at 43 to form the envelope. The open fourth edge of the membrane 40 is shown in FIG. 3 bonded in fluid tight relation to mandrel or tube 50 and is in communication with the interior of the tube through openings 52, spaced along the length of the tubular member 50. In the construction of the membrane module this tubular member 50 serves as a mandrel while the membrane 40 is being wound thereabout to assume a spiral configuration. A separator grid 56 consisting of a relatively incompressible material highly permeable to water is placed between the membrane surfaces so that water may pass therebetween with maximum exposure to the membrane surfaces. Examples of the specific types of materials which may be used for the membrane separator grid and spacing or packing means are set forth in the above mentioned patents.

Although spiral wrap of the membrane may be known, the construction of membrane modules which may be connected in series as set forth herein forms an important part of this invention. Referring to the area of the tube wrapped by the membrane 40 as the module body portion, it will be seen that a first end portion 50a of the mandrel or tube 50 extends beyond the body portion in a first direction and a second portion 50b extends beyond the body portion in the opposite second direction. The module 32 and other modules in the system may be similarly constructed. A suitable sealing means such as a circumferential groove 36 having an O-ring or similar sealing means 38 therein may be provided on each of the first and second ends 50a, 50b. In the construction shown the first end 50a of the module 30, is received in a recess 37 in the head 14 to form a fluid tight joint therewith. The second end 50b of the module 30 also has a sealing means 36, 38. If two or more modules are used, the end 50b is connected to the first end 50a of the next adjacent module in series. This may be a stab joint or, as shown, a separate connector 60 may be provided. An end closure connector 64 caps the second end 50b of the single module or the last module in series. The end closure slides over the inlet tube 26 and engages the second end 50b in fluid tight relation to block off the end 70a of the passageway 70. In addition a securing means 65 may be provided to lock the closure against movement. This closure also serves to retain the module in place.

The head or first end 14 of the module assembly 10 includes therein or therewith the necessary plumbing connection to allow feed water to be supplied into the assembly chamber 12 and waste and product water to be removed therefrom. Thus, the head 14 includes a feed water inlet means 20 onto which a source of feed water is to be connected. With the head 14 made of a suitable synthetic plastic material, the inlet means 20 may include a suitable metallic connector bushing 22 having a first end 22a extending outwardly from the head 14 and a second end 22b embedded in the head. An elongated inlet feed tube 26 has a hollow passageway 27 therethrough which is in fluid communication with the inlet connector means 20. A first end 26a of the tube 26 is received in a recess 28 provided in the head 14. The tube 26 is of a configuration slightly less than the inner size of the mandrel tube 50 and extends beyond the last module through the end closure 64. A suitable sealing means such as a groove 66 having an O-ring 68 therein effects a fluid tight seal between the inlet tube 26 and the end closure 64 that seals off the passageway 70 which is created between the outside of the inlet tube 26 and the inside of the tube mandrel 50.

The holes 52 in the mandrel tube 50 communicate with the passageway 70 which in turn communicates by means of an upper enlarged passageway 72 and an oblique passageway 74 with the product water outlet means 76. When the head 14 is made of a suitable synthetic plastic material the product water outlet means 76 may include a suitable metallic connector bushing 78 having a first end 78a outwardly of the head 14 and a second end 78b seated in the head 14.

A waste water outlet means 80 connects with the chamber 12 through a passageway 82 in the head or first end 14. An auxiliary collector passageway 84 in the form of a groove in the inside of the head 14 facilitates flow of the waste water. A suitable screen means 86 over the collector groove 84 is provided to prevent passage of foreign material through the waste water outlet 80. With the head 14 made of a suitable synthetic plastic material, the waste water outlet means 80 may include a suitable metallic connector bushing 81 having a first end 81a outwardly of the head 14 and a second end 81b seated in the head 14.

Figure 2:
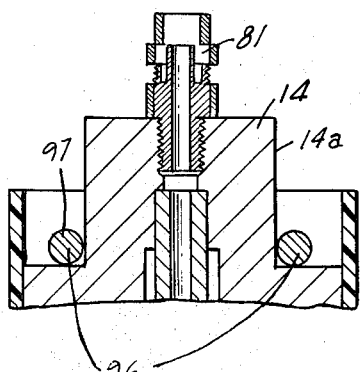
FIG. 2 is a cross-section through the head or first end taken in a plane normal to the cross-sectional plane of FIG. 1.
Figure 4:
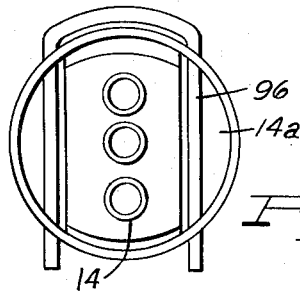
FIG. 4 is a plan view of the top of the assembly illustrating the method of locating the U-shaped securing means for the head.

The head 14 may be suitably detachably connected to the body shell 16 and include a fluid seal means 90 such as an O-ring received in a circumferential groove 92. It is an advantage of the invention that the membrane modules indicated at 30 and 32 may be removed from the chamber 12 and therefore the head or first end 14 must be of a size equal to or larger than the cross-sectional configuration of the membrane modules. A means of securement of the first end 14 in the body shell 16 which will withstand the high chamber pressures may be provided by a U-shaped connector member 96 as shown in FIGS. 2 and 4 which extends through suitable openings 97 in the upper portion of the body shell 16 and is seated in notched portions 14a of the head 14.

By means of the module arrangement according to the invention a single standardized size membrane module may be used in the assemblies of different lengths and capacities. The tube 26, removable from the chamber 12 with the head 14, serves as a convenient mounting means for the modules and also provides a means for facilitating insertion and removal of the modules from the chamber 12. This is a significant advantage which clearly distinguishes the membrane module assembly of the invention from the prior art. Plumbing the module assembly from only one end provides the additional advantage of allowing greater flexibility in placement of the membrane module assembly, requires one less joint, (and area for potential leakage) and is simpler to manufacture and repair than the prior art devices.

Assembly of the apparatus 10 according to the invention is accomplished by permanently or removably securing the tube 26 in the recess 28 of the head 14 and sliding the module or modules onto the tube 26 so that the first end 50a of the first module is received in a recess 37 in the head. This fixes the first module in place and if additional molecules are to be attached, a connector 60 is forced over the second end 50b of the first module 30. The coupling 60 is configured so that it may receive the first end 50a of the next module in fluid tight engagement to preserve the product water passageway 70. After the last module has been positioned on the tube 26, the end closure 64 is slid onto the tube 26 to cap the remote end 70a of the product water passageway 70. A suitable securing means 65 attached over the tube 26 will serve to keep the end closure 64 in position and prevent movement of the modules along the tube 26. With the modules in position and with or without the connecting conduits for feed water, product water and waste water attached, the head and modules are passed through the open end of the body shell 16 into the chamber 12 until a point has been reached where the securing means 96 may be put into position. At this time the membrane module assembly will be ready to begin operation. Because certain membrane materials are required to be kept wet to preserve their ability to function, other additional assembly steps may be required, however, these will be known to those skilled in the art and will not be set forth here.

In operation, the feed water containing undesirable impurities enters the inlet means 20 and is passed down through the passageway 27 in the tube 26 to enter the chamber 12 through an outlet 27a adjacent the second end 18. From the outlet 27a the feed water flows along the chamber 12 toward the first end 14 through the membrane 40 of the modules 30 and 32 positioned therein. Thus, the feed water is blocked from passing through the space 17 by the seal 17a so that the water flows between the membranes 42 and 44 through the passageways created by the porous membrane separator 56. With the inlet feed water under a pressure in the order of about 200 pounds per square inch and the product water under a pressure in the order of 30 pounds per square inch, a pressure difference of about 170 pounds per square inch occurs across the membrane from the feed water side to the product water side. The membranes 42 and 44 are preferentially permeable to water molecules so that as the feed water containing the undesirable impurities passes adjacent the membranes the water molecules will be forced by this pressure difference through the membranes 42 and 44 into the membrane support material 46.

Inside the membrane envelope 40 the pure product water passes along the spiral configuration via membrane support material 46 of the envelope-type membrane 40 until it reaches the openings 52 in the mandrel 50 at which point it enters the product water passage 70 to be conveyed out through the product water outlet means 76.

The residue of the feed water which does not pass through the permeable membrane passes out of the membrane module assembly as waste water through the screen 86 into the collector groove 84, through the passageway 82 and out to the waste water outlet 80. In practice, the flow of water through the membrane module assembly is kept at a high rate so that the turbulent action of the water on the membrane keeps the surface of the membrane free of a build-up of impurities. This is important for optimum membrane performance and to extend the membrane life. In time, the modules may diminish in effectiveness to the point where it is advantageous that they be replaced. At this time, operation is interrupted, the securing means 96 are removed and the head 14 and attached modules withdrawn from the chamber 12 to be replaced with new modules in a manner heretofore set out.

From the above description of the invention, it may be seen that there has been provided an efficient and simple reverse osmosis membrane module assembly having great design flexibility which overcomes the disadvantages of the prior art and which is convenient in use and simple to manufacture and maintain.

Although minor modifications might be suggested by those versed in the art, it should be understood that we wish to embody within the scope of the patent warranted hereon all such modifications as reasonably and properly come within the scope of our contribution to the art.

We claim:

1. A reverse osmosis membrane module assembly comprising a receptacle having a detachable closure means, said receptacle and closure means defining a chamber, a membrane module means in said chamber, said chamber having a feed water inlet means, a product water outlet means and a waste water outlet means in communication therewith through said closure means, said feed water inlet means including an elongated inlet tube having a first end connected with said closure means and a second outlet end extending into said chamber whereby said feed water enters said chamber at a point remote from said closure means, said inlet tube providing a mounting means for said membrane module means.

2. A reverse osmosis membrane module assembly according to claim 1 wherein said chamber is generally cylindrical and said membrane module means have a generally cylindrical configuration, said membrane module means having an outside diameter less than the inside diameter of said chamber, said closure means so that said module means may be easily moved into and out of said chamber, and a seal means between said outside diameter of said membrane module and said inside diameter of said chamber.

3. A reverse osmosis membrane module assembly according to claim 1 wherein said membrane module means includes a hollow tubular member extending therethrough, said inlet tube extending through said tubular member when said module is mounted on said inlet tube, said inside configuration of said module tubular member being slightly larger than said outside configuration of said inlet tube to leave a space therebetween, said space forming a product water passageway, said membrane module means separating product water from feed water and conducting said product water through said hollow tubular member into said product water passageway, said product water passageway being connected to said product water outlet means whereby product water may be removed separately from the chamber.

4. A reverse osmosis membrane module assembly according to claim 3 wherein said inlet tube extends beyond said membrane module tubular member, a tubular member end closure being connected with said tubular member and about said inlet tube means to close said product water passageway and to prevent movement of said modules on said tube.

5. A reverse osmosis membrane module assembly according to claim 1 wherein said membrane module means includes a plurality of modules mounted in series on said inlet tube, and a closed product water passageway extending through said modules to said product water outlet means.

6. A reverse osmosis membrane module assembly according to claim 1 wherein said membrane module means includes first and second modules each having a body portion and a hollow tubular member extending through said body portion, said tubular members receiving said inlet tube therethrough, said tubular members having a first end extending beyond said body portion in one direction and a second end extending beyond said body portion in an opposite direction, said first end portion of said first module being connected to said closure means, said first end portion of said second module being connected to said second end portion of said first module, said second end portion of said second module having an end closure thereon.

7. A reverse osmosis membrane module assembly comprising a receptacle having a detachable closure means, said receptacle and closure means defining a chamber, membrane module means in said chamber, said chamber having a feed water inlet means, a product water outlet means and a waste water outlet means in communication therewith through said closure means whereby feed water enters said feed water inlet means through said closure means, is conducted in a first direction through said chamber past said membrane module means, outlets into said chamber, flows in a second generally opposite direction back through said membrane module means, is separated into product water and waste water by said module means, and, thus separated, leaves said chamber through said closure means.

* * * * *